United States Patent [19]

Dubois et al.

[11] 3,855,314

[45] Dec. 17, 1974

[54] METHOD OF SYNTHESIZING ISOPENTANE HYDROPEROXIDE

[75] Inventors: Claude Dubois, Martigues; Jean Maurin, Seine Maritime, both of France

[73] Assignee: Compagnie Francaise de Raffinage, Paris, France

[22] Filed: Mar. 25, 1971

[21] Appl. No.: 127,958

[30] Foreign Application Priority Data

Mar. 27, 1970 France .............................. 70.11121

[52] U.S. Cl. ......................... 260/610 B, 260/617 H
[51] Int. Cl. ............................................. C07c 73/06
[58] Field of Search ..................... 260/610 B, 617 H

[56] References Cited
UNITED STATES PATENTS

| | | |
|---|---|---|
| 2,733,270 | 1/1956 | Fisher .............................. 260/604 |
| 2,845,461 | 7/1958 | Winkler et al. ................. 260/610 B |
| 2,862,973 | 12/1958 | Winkler et al. ................. 260/610 B |
| 2,843,633 | 7/1958 | Natta et al. ...................... 260/610 B |
| 3,360,584 | 12/1967 | Kollar.............................. 260/610 B |
| 3,523,976 | 8/1970 | Reni et al. ........................... 260/610 |

*Primary Examiner*—Bernard Helfin
*Assistant Examiner*—W. B. Lone
*Attorney, Agent, or Firm*—Curtis, Morris & Safford

[57] ABSTRACT

In the synthesis of an alpha diolefin (exemplified by isoprene) involving the hydroperoxidation of a saturated hydrocarbon (such as, isopentane with molecular oxygen), the improvement in yield of the hydroperoxide by the addition to the hydroperoxidation reactor of a tertiary alcohol (e.g. 2-methyl 2-butanol).

3 Claims, 3 Drawing Figures

METHOD OF SYNTHESIZING ISOPENTANE HYDROPEROXIDE

The present invention relates to a method for the hydroperoxidation of isopentane by action of a gas containing molecular oxygen, whether or not diluted in an inert gas. More particularly, it relates to an improvement in said method.

Isopentane hydroperoxide is an intermediate product in the manufacture of isoprene from isopentane and methyl-2-butylene. It is a highly desired monomer because of the elastomers to which it is a precursor upon homopolymerization or copolymerization with other monomers.

In the above-indicated method of manufacturing isoprene, isopentane hydroperoxide serves, in the presence of a suitable catalyst such as molybdenum naphthenate, to oxidize methyl-2-butylene into methyl 2,3-butanediol or into methyl 2,3-epoxy butane, depending upon whether the reaction is carried out in the presence or absence of water. The diol or epoxide then leads to isoprene by dehydration.

The ordinary method used to effect the synthesis of isopentane hydroperoxide consists in reacting molecular oxygen with isopentane in liquid phase. The hydroperoxidation is carried out under pressure at a temperature generally between 100° and 200°C. Good contact between the liquid and the gas is assured by any suitable means. This general technology is disclosed in applicants' coworkers' applications, Ser. Nos. 30,276, 34,172, and 40,278.

It is found that by this method it is impossible to obtain an isopentane conversion of more than 15 per cent without a substantial increase in the production of the by-products, such as, 2-methyl 2-butanol, acetone, ethanol and acetic acid.

An object of the present invention is to improve the selectivity of such a reaction for isopentane hydroperoxide in the synthesis of this compound.

The applicants have found that the addition of certain substances to the reaction medium increases the yield of isopentane hydroperoxide for a given isopentane conversion rate.

The present invention concerns, therefore, a method of synthesizing isopentane hydroperoxide by action of molecular oxygen, whether or not diluted in an inert gas, on isopentane in liquid phase. Specifically, the hydroperoxidation reaction is carried out in the presence of an amount of tertiary alcohol equal to between 0.75 per cent and 15 per cent of the total number of gram molecules constituting the liquid reaction medium.

The present invention concerns the isopentane hydroperoxide prepared by the disclosed method.

The tertiary alcohols generally used in the present invention are: tertiary butyl alcohol, 2-methyl 2-butanol, 2-methyl 2-pentanol, and 3-methyl 3-pentanol. Other tertiary alcohols may be used; for example, 2-phenyl 2-propanol.

In a batch method of preparation of isopentane hydroperoxide, the tertiary alcohol is introduced into the reactor before initiating the reaction in an amount, expressed in gram molecules of between 0.75 per cent and 15 per cent and, preferably, 0.75 and 8 per cent of the isopentane introduced.

In a continuous method tertiary alcohol is maintained in the reactor at a substantially constant amount of between 0.75 per cent and 15 per cent and, preferably, between 0.75 and 8 per cent, expressed in gram molecules of the liquid components of the reaction medium.

The applicants have found that the addition of tertiary alcohol to the reaction medium not only increases the yield of isopentane hydroperoxide and reduces the yield of 2-methyl 2-butanol, but also, even more unexpectedly, reduces the yields of acetone and acetic acid for a given isopentane conversion rate.

The total amount of by-products of the hydroperoxidation produced is, therefore, decreased. Moreover, it has been found that under certain conditions practically no tertiary alcohol is consumed at all in the reaction, contrary to what would occur if a secondary alcohol were introduced into the medium.

Among the tertiary alcohols which can be used, 2-methyl 2-butanol is particularly advantageous since it constitutes one of the by-products of the hydroperoxidation of isopentane.

When isopentane hydroperoxide is subsequently contacted with an olefin, having at least four carbon atoms so as to give rise to the diol or the epoxide which are the precursors of the diolefin of the same carbon structure as the olefin, 2-methyl 2-butanol, which comes from the reduction of the isopentane hydroperoxide, may advantageously be separated from the reaction medium and used as additive in the synthesis of the isopentane hydroperoxide.

In this specification and the accompanying drawings, we have shown and described in preferred embodiments of our invention and have suggested various alternatives and modifications thereof; but it is to be understood that these are not intended to be exhaustive and that many other changes and modifications can be made within the scope of the invention. These suggestions herein are selected and included for purposes of illustration in order that others skilled in the art will more fully understand the invention and the principles thereof and will thus be enabled to modify it and embody it in a variety of forms, each as may be best suited to the conditions of a particular use.

Figure 1:
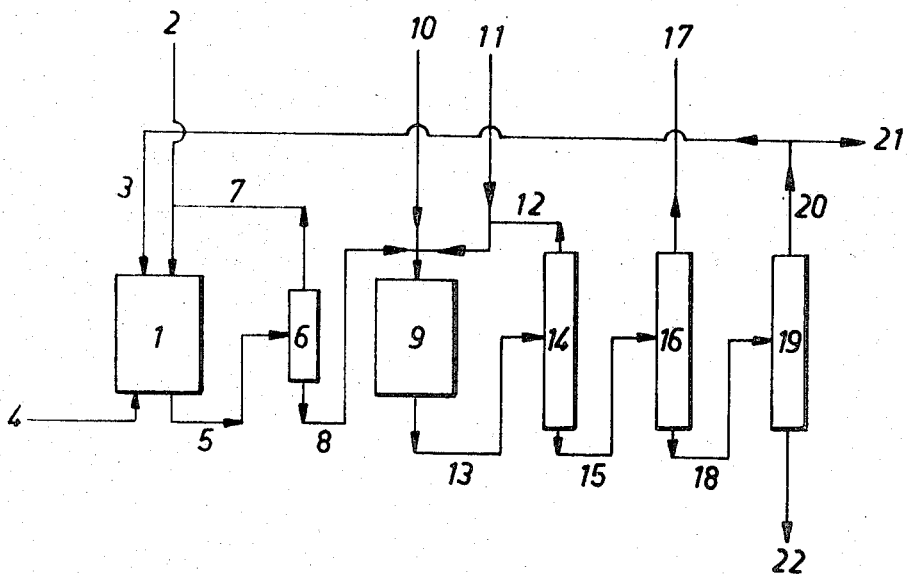
FIG. 1 is a diagram showing the application of the method of the present invention to the preparation of methyl-2,3-butanediol.

A specific embodiment of the present invention will now be described with reference to FIG. 1, illustrating the preparation of methyl 2,3-butanediol, which leads to isoprene by dehydration.

Isopentane 2-methyl 2-butanol and air are introduced into a hydroperoxidation reactor 1 through the lines 2, 3, and 4, respectively. The reaction is carried out under pressure at a temperature close to 150°C and with vigorous agitation of the medium. The reaction products are removed through the line 5 and introduced into a flash distillation column 6 where the isopentane is removed via line 7 and recycled. The other products, consisting primarily of isopentane hydroperoxide, are discharged through the line 8, which feeds the oxidation reactor 9. Water and methyl-2-butylene are also introduced into the reactor 9 through the lines 10 and 11, respectively. The catalyst used in this reactor may be, for example, molybdenum naphthenate. The reaction temperature is about 120°C. The reaction products are introduced through the line 13 into a distillation column 14 at the top of which the unreacted methyl-2-butylene is collected through the line 12 and recycled. Line 15, extending from the column 14, feeds a distillation column 16, from the top of which acetone, a by-product, is eliminated through line 17.

The other components pass out through line 18 and pass into yet another distillation column 19. The head fraction, passing through the line 20, consists primarily of 2-methyl 2-butanol. It also contains byproducts, such as, methyl isopropyl ketone and traces of water. A part of this fraction is recycled into the isopentane hydroperoxidation reactor through the line 3, while the rest is sent through the line 21 into a dehydration reactor to supply the methyl 2-butylene which is recycled to the oxidation reactor 9. The dehydration reactor and the recycling of the methyl 2-butylene have not been shown in FIG. 1. The products discharged through the line 22 contain primarily methyl 2,3-butanediol which, after removal of the traces of catalyst and by-products, such as, acetic acid, provides isoprene by catalytic dehydration. It is important not to recycle thr traces of acetic acid into the reactor 1 via the line 20 and then the line 3. This would have a harmful effect on the isopentane hydroperoxidation reactor.

The invention is, furthermore, illustrated by the following examples, which are not limitative in character:

EXAMPLE I

The tests described in this example were carried out without adding tertiary alcohol to the reaction medium. They are given in order to permit comparisions with the method of the invention. The manner of operation described below will not be changed in the other examples.

One starts from refinery isopentane, purified by distillation, having an isopentane content by weight of 96.8 per cent. The main impurities are normal pentane (1.5 per cent), normal butane (0.98 per cent), and methyl butylene (0.48 per cent).

600 cc of isopentane, mixed with 0.49 per cent by weight isopentane hydroperoxide to initiate the hydroperoxidation reaction, are charged into a one-liter autoclave. The autoclave used is stainless steel polished on the inside. All parts in contact with the liquid to be oxidized are of stainless steel and have previously been carefully cleaned to avoid contamination by metal ions.

A pressure of 9 bars of pure oxygen is established in the autoclave, and the liquid is agitated by means of an oscillating cradle device. The temperature is gradually brought to 150°C and maintained at this value. A constant, total pressure of 31 bars is maintained by pressurizing with pure oxygen. The time of reaction varies, depending on the isopentane conversion rate. It varies between 60 and 110 minutes for isopentane conversion rates of between 9 per cent and 18 per cent, respectively.

At the end of the test, the autoclave is cooled rapidly to room temperature and then brought to −70°C. The gases, as well as the liquids, are then separated and analyzed.

The tests were carried out with conversion rates of between 9 and 18 per cent. The results of these tests are represented by Curve A in FIG. 2 and Curve C in FIG. 3.

Curve A represents the variation of the yield of hydroperoxide (expressed in percent gram molecules of converted isopentane) as a function of the isopentane conversion rate (expressed in per cent gram molecules of isopentane introduced).

Curve C shows the variation of the yield of compounds having the carbonyl function (primarily acetone) as a function of the isopentane conversion rate.

In order to draw the curves, the averages of the values of the numerous measurements made were used.

EXAMPLE II

This is an example illustrating the method of the present invention wherein 2-methyl 2-butanol is added to the reaction medium. The manner of operation is in all other respects identical to that described in Example I. The 2-methyl 2-butanol is introduced at the same time as the isopentane in an amount of between 1 and 8 per cent of the number of gram molecules of isopentane introduced.

The tests were carried out with conversion rates of between 9 and 18 per cent.

Figure 2:
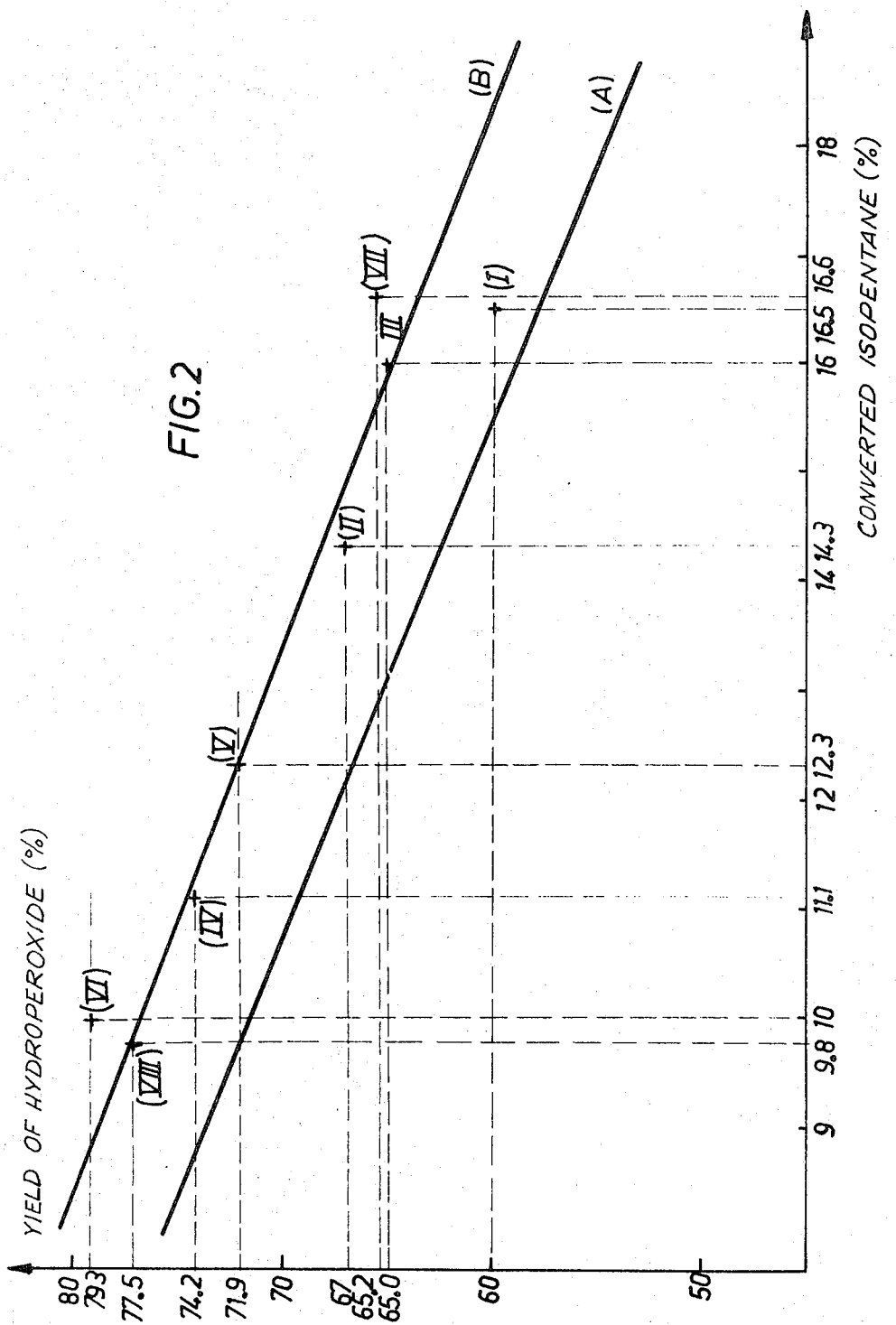
FIG. 2 is a graph indicating the variation in the yield of isopentane hydroperoxide produced, expressed in per cent gram molecules of converted isopentane, as a function of the conversion rate of the isopentane.
Figure 3:
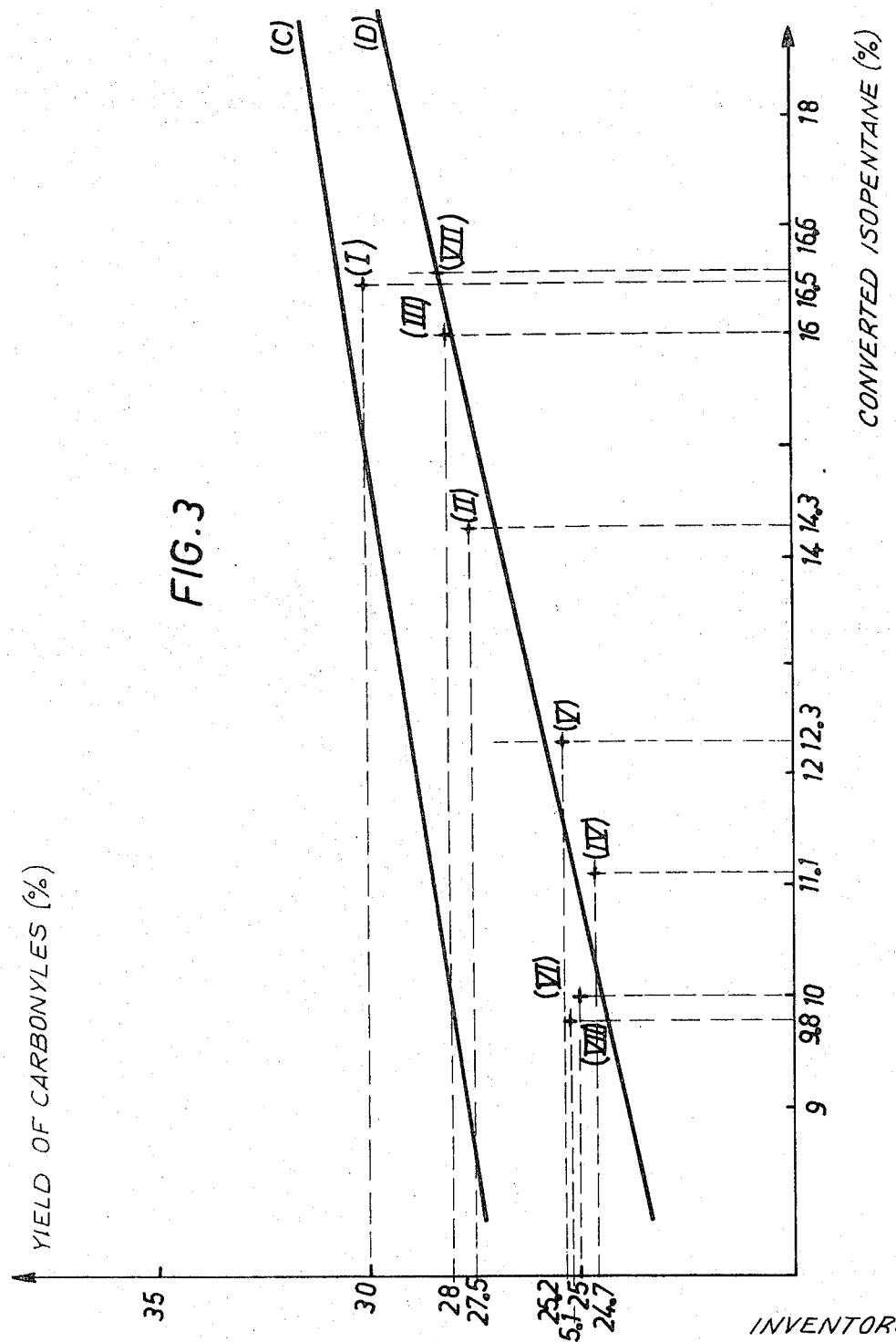
FIG. 3 is a graph indicating the variation in the yield of compounds having the carbonyl function, expressed in per cent gram molecules of converted isopentane as a function of the conversion rate of the isopentane (in the method of preparing isopentane hydroperoxide).

The results obtained are represented by Curve B in FIG. 2 for the yield of isopentane hydroperoxide and by Curve D in FIG. 3 for the yield of compounds having the carbonyl function.

Collected in Table I are several measurements, including those which were made in order to draw Curves B and D. In this table are set forth in successive order the following values:

the amount of 2-methyl 2-butanol introduced (expressed in per cent gram molecules (%) of isopentane introduced);

the isopentane converted in the test under consideration (expressed in per cent gram molecules (%) of the

TABLE I

| Test | I | II | III | IV | V | VI | VII | VIII |
|---|---|---|---|---|---|---|---|---|
| 2-methyl 2-butanol introduced | 0.75 | 1 | 2 | 2 | 4 | 8 | 8 | 12 |
| converted isopentane | 16.5 | 14.3 | 16.0 | 11.1 | 12.3 | 10.0 | 16.6 | 9.8 |
| yields of isopentane hydroperoxide | 60.0 | 67.0 | 65.0 | 79.2 | 71.9 | 79.3 | 65.2 | 77.5 |
| yield of compounds having the carbonyl function | 30.0 | 27.5 | 28.0 | 24.7 | 25.2 | 25.0 | 28.0 | 25.1 |

Points representative of these measurements have been set forth in FIGS. 1 and 2. The number of the corresponding test is shown, in parenthesis, beside each point.

isopentane introduced); and the yields of isopentane hydroperoxide and of compounds having a carbonyl function (expressed in per cent gram molecules (%) of converted isopentane).

Comparisons between Curves A and B of FIG. 2 and between Curves C and D of FIG. 3 show the importance of the method of the invention. The yield of isopentane hydroperoxide is in all cases improved for a given conversion rate. Under the same conditions, the production of compounds having the carbonyl function is decreased.

These phenomena do not occur when the amount of 2-methyl 2-butanol is less than about 0.75 per cent of the amount of isopentane introduced, expressed in gram molecules. This lower limit corresponds substantially to the value of the concentration of 2-methyl 2-butanol at the end of the hydroperoxidation reactor when no 2-methyl 2-butanol is introduced into the reaction. It is known, as a matter of fact, that 2-methyl 2-butanol is a byproduct of the reaction of the formation of isopentane hydroperoxide. On the other hand, the addition of quantities of 2-methyl 2-butanol of more than 15 per cent is of little interest, since, on the one hand, it is not advantageous merely from an economic standpoint to add large quantities of an additive, and, on the other hand, the yield of isopentane hydroperoxide does not increase beyond an addition of about 8 per cent 2-methyl 2-butanol. A comparison of the representative points of Tests VI and VIII in FIGS. 2 and 3 shows that the change from an addition of 8 per cent to an addition of 12 per cent of 2-methyl 2-butanol does not bring about any advantage. This is why the preferred range is this case consists of the concentration range of 0.75 per cent to 8 per cent.

EXAMPLE III

This is an example illustrating the method of the present invention wherein tertiary butyl alcohol and 3-methyl 3-pentanol are added, respectively.

The manner of operation is identical to that described in Example I. Tests were carried out, on the one hand, with the addition of different quantities of tertiary butyl alcohol and, on the other hand, without addition of this alcohol, each resulting pair of tests having indentical conversion rates in both cases. The results of these tests are set forth in Table II.

TABLE II

| Test No. | 1 | 1' | 2 | 2' | 3 | 3' |
|---|---|---|---|---|---|---|
| Tert. butyl alcohol introduced (in mole% of isopentane introduced | 2 | w/o addn of tert. butyl alcohol | 4 | w/o addn of tert. butyl alcohol | 8 | w/o addn of tert. butyl alcohol |
| Reaction Time | 1h. 50mn | | 1h. 50mn | | 1h. 50mn | |
| Converted isopentane (mole% of converted isopentane) | 17.6 | 17.6 | 18.1 | 18.1 | 18.7 | 18.7 |
| Yield of isopentane hydroperoxide (mole% of converted isopentane) | 58.1 | 55.5 | 59.5 | 54.5 | 60.5 | 59.5 |
| Compounds with carbonyl function formed (mole % of converted isopentane | 29.0 | 31.3 | 29.4 | 31.5 | 29.8 | 31.6 |
| 2-methyl 2-butanol formed (mole % of converted isopentane | 0.6 | 6.2 | 0.6 | 6.3 | 0.6 | 6.4 |

Similarly, in Table III are set forth the results of tests carried out, on the one hand, with the addition of different quantities of 3-methyl 3-pentanol and, on the other hand, without addition of this alcohol with each pair of tests having identical conversion rates.

TABLE III

| Test No. | 4 | 4' | 5 | 5' | 6 | 6' |
|---|---|---|---|---|---|---|
| 3-methyl 3-pentanol introduced (in mole% of isopentane introduced) | 1 | w/o addn of 3-methyl 3-pentanol | 2 | w/o addn of 3-methyl 3-pentanol | 4 | w/o addn of 3-methyl 3-pentanol |
| Reaction Time | 1h. 30mn | | 1h. 45mn | | 1h. 40mn | |
| Converted isopentane mole% of isopentane introduced) | 16.3 | 16.3 | 16.5 | 16.5 | 17.1 | 17.1 |

TABLE III—Continued

| Test No. | 4 | 4' | 5 | 5' | 6 | 6' |
|---|---|---|---|---|---|---|
| Yield of isopentane hydroperoxide (mole% of isopentane converted) | 64.5 | 58.7 | 63.0 | 58.1 | 64.4 | 56.2 |
| 2-methyl 2-butanol formed (mole% of isopentane converted) | <0.7 | 5.9 | <0.7 | 6.0 | <0.7 | 6.1 |
| Compounds with carbonyl function formed (mole % of isopentane converted) | 28.1 | 30.5 | 28.4 | 30.6 | 28.8 | 30.9 |

It is seen that the method of the invention makes it possible to increase the yield of isopentane hydroperoxide and decrease the yield of 2-methyl 2-butanol and of compounds having the carbonyl function for a given conversion of isopentane. It also makes it possible for a given yield of isopentane hydroperoxide to increase the conversion rate of the isopentane.

We claim

1. In the method of noncatalyzed synthesis of isopentane hydroperoxide from isopentane in a liquid reaction medium by action of molecular oxygen, the improvement consisting essentially of hydroperoxidizing isopentane at a temperature between 100° and 200°C by adding to the liquid reaction medium tertiary alcohol selected from the group consisting of tertiary butyl alcohol, 2-methyl 2-butanol, 2-methyl 2-butanol, 2-methyl 2-pentanol, and 3-methyl 3-pentanol in an amount between 0.75 per cent and 8 per cent of the total number of gram molecules constituting the liquid reaction medium.

2. A method according to claim 1, wherein the tertiary alcohol is added before the starting of the hydroperoxidation reaction.

3. A method according to claim 1, wherein the tertiary alcohol is added during the hydroperoxidation reaction.

* * * * *